(12) United States Patent
Furudate et al.

(10) Patent No.: US 8,744,460 B2
(45) Date of Patent: Jun. 3, 2014

(54) RADIO COMMUNICATION SYSTEM, TERMINAL APPARATUS, AND RADIO COMMUNICATION METHOD IN RADIO COMMUNICATION SYSTEM

(75) Inventors: Hideki Furudate, Kawasaki (JP); Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/940,751

(22) Filed: Nov. 5, 2010

(65) Prior Publication Data

US 2011/0111762 A1   May 12, 2011

(30) Foreign Application Priority Data

Nov. 11, 2009   (JP) ................... 2009-257903

(51) Int. Cl.
*H04W 72/00*   (2009.01)

(52) U.S. Cl.
USPC .......................................... 455/450; 370/329

(58) Field of Classification Search
USPC .............. 455/517, 458, 426.1, 450; 370/328, 370/329; 375/260; 709/224, 245
See application file for complete search history.

(56) References Cited

U.S. PATENT DOCUMENTS

| | | | |
|---|---|---|---|
| 5,852,405 A | 12/1998 | Yoneda et al. | |
| 7,200,366 B2 | 4/2007 | Kawamura et al. | |
| 2005/0254449 A1* | 11/2005 | Halfmann et al. | 370/328 |
| 2006/0168343 A1* | 7/2006 | Ma et al. | 709/245 |
| 2006/0229092 A1* | 10/2006 | Jia et al. | 455/517 |
| 2008/0310528 A1* | 12/2008 | Soong et al. | 375/260 |
| 2009/0088185 A1* | 4/2009 | Beale | 455/458 |
| 2009/0116430 A1* | 5/2009 | Bonta et al. | 370/329 |
| 2010/0009675 A1* | 1/2010 | Wijting et al. | 455/426.1 |
| 2010/0189046 A1* | 7/2010 | Baker et al. | 370/329 |
| 2011/0002275 A1* | 1/2011 | Shousterman | 370/329 |

FOREIGN PATENT DOCUMENTS

| | | |
|---|---|---|
| JP | 08-256153 A | 10/1996 |
| JP | 11-68848 | 3/1999 |
| JP | 2000-244522 A | 9/2000 |
| JP | 2007-060289 | 3/2007 |
| JP | 2008-283580 | 11/2008 |

OTHER PUBLICATIONS

ARIB Standard T-71 Ver. 5.0, Dec. 12, 2007, pp. 13-15, 23-24, 87 Partial.
"Carrier-sense mechanism", IEEE Std. 802.11 1999 Edition Dec. 1, 1999, p. 73.
Japanese Office Action mailed Mar. 4, 2014 for corresponding Japanese Application No. 2009-257903, with partial English-language translation.

* cited by examiner

*Primary Examiner* — Nathan Taylor
(74) *Attorney, Agent, or Firm* — Fujitsu Patent Center

(57) ABSTRACT

A radio communication system including a first terminal apparatus group for performing a reception by using a first radio resource and a transmission by using a second radio resource; and a second terminal apparatus group for performing the reception by using the second radio resource and the transmission by using the first radio resource, for performing a direct radio communication. The system includes a first terminal which belongs to the first terminal apparatus group and transmits allocation request of transmission band in the second radio resource by using the second radio resource; and a second terminal which belongs to the second terminal apparatus group, receives the allocation request transmitted from the first terminal, and transmits information indicating allocation of the transmission band for the first terminal, wherein the first terminal transmits data by using the allocated transmission band in the second radio resource.

6 Claims, 13 Drawing Sheets

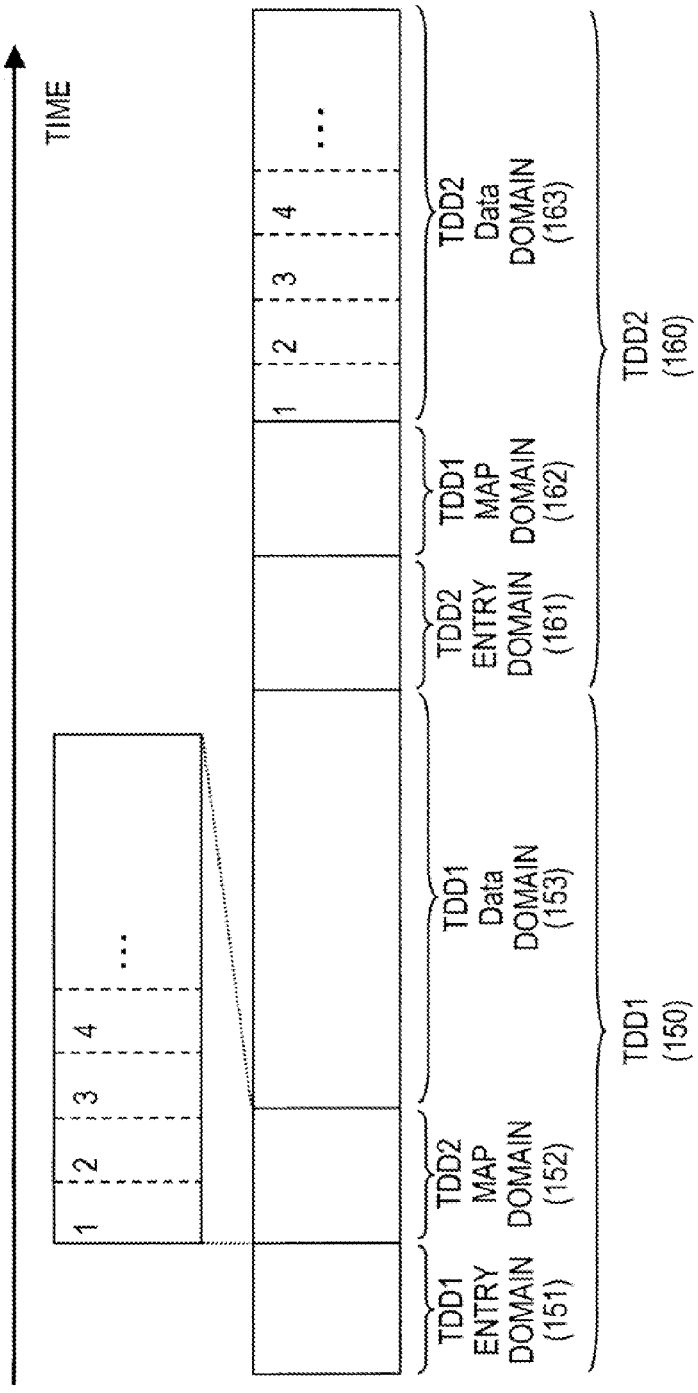

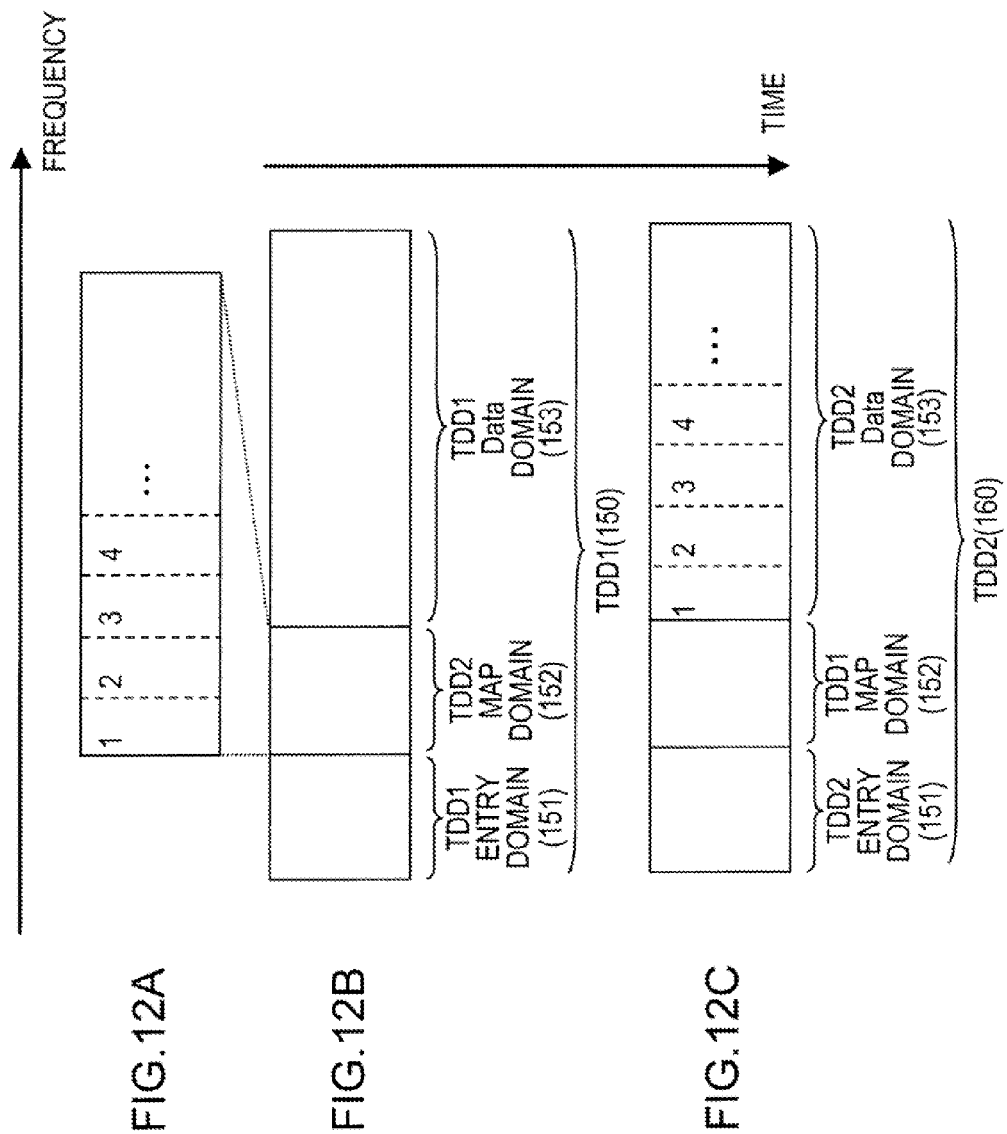

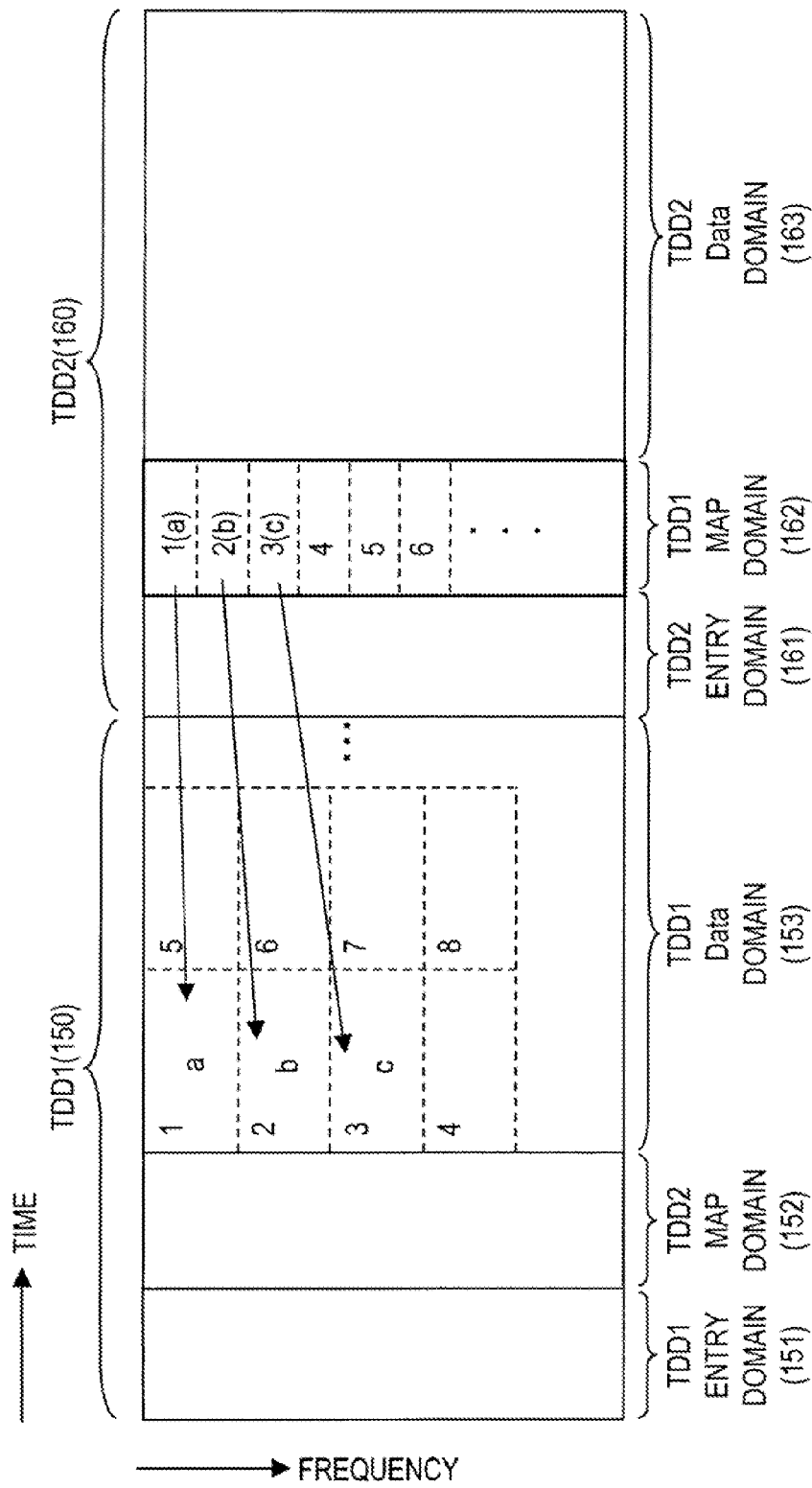

US 8,744,460 B2

RADIO COMMUNICATION SYSTEM, TERMINAL APPARATUS, AND RADIO COMMUNICATION METHOD IN RADIO COMMUNICATION SYSTEM

CROSS-REFERENCE TO RELATED APPLICATIONS

This application is based upon and claims the benefit of priority of the prior Japanese Patent Application No. 2009-257903, filed on Nov. 11, 2009, the entire contents of which are incorporated herein by reference.

FIELD

The embodiments discussed herein are related to a radio communication system, a terminal apparatus, and a radio communication method in a radio communication system.

BACKGROUND

There is a carrier sensing known as a conventional technology with regard to a radio communication system. In the carrier sensing, for example, a terminal apparatus detects a radio band used by another terminal apparatus on the basis of a reception signal from another terminal apparatus, and performs a radio communication by using another radio band which is not used by the another terminal on the basis of the detected radio band.

Non patent document 1: IEEE802.11a
Non patent document 2: ARIB STD-T71
Patent document 1: Japanese Laid-open Patent Publication No. H8-256153
Patent document 2: Japanese Laid-open Patent Publication No. 2000-244522

However, if the carrier sensing is performed in a terminal-to-terminal communication, so-called a "hidden terminal problem" may occur, such that the radio band of the another terminal which cannot receive radio wave cannot be detected, and the another terminal becomes a hidden terminal. Due to a hidden terminal problem, there may be a case that a plurality of terminal apparatuses use the same radio band, and the plurality of terminal apparatuses cannot perform the radio communication with each other. In such a case, a reception of data and the like among the plurality of terminal apparatuses is not possible, and thus radio band is not efficiently used. Therefore, the throughput cannot be enhanced.

SUMMARY

According to an aspect of the invention, a radio communication system including a first terminal apparatus group for performing a reception by using a first radio resource and a transmission by using a second radio resource; and a second terminal apparatus group for performing the reception by using the second radio resource and the transmission by using the first radio resource, for performing a direct radio communication between terminals belonging to the first and second terminal apparatus group, the radio communication system including: a first terminal which belongs to the first terminal apparatus group and transmits allocation request of transmission band in the second radio resource by using the second radio resource; and a second terminal which belongs to the second terminal apparatus group, receives the allocation request transmitted from the first terminal, and transmits information indicating allocation of the transmission band for the first terminal, wherein the first terminal transmits data by using the allocated transmission band in the second radio resource if the first terminal receives the information indicating the allocation of transmission band.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11A and FIG. 11B illustrate a configuration example of a radio frame.
FIG. 12A to FIG. 12C illustrate a configuration example of a radio frame.
FIG. 13 illustrates a configuration example of a radio frame.

DESCRIPTION OF EMBODIMENTS

Embodiments of the present invention will be explained below.

Figure 1:
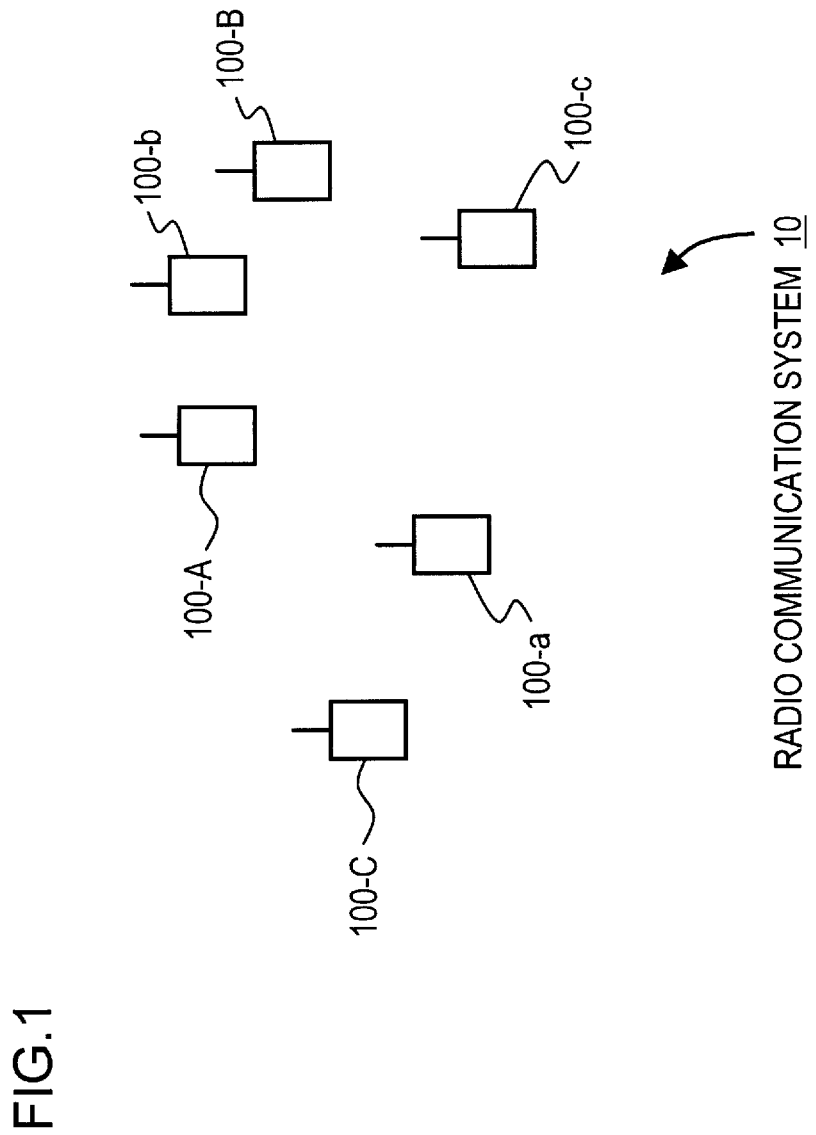
FIG. 1 illustrates a configuration example of a radio communication system.
Figure 2:
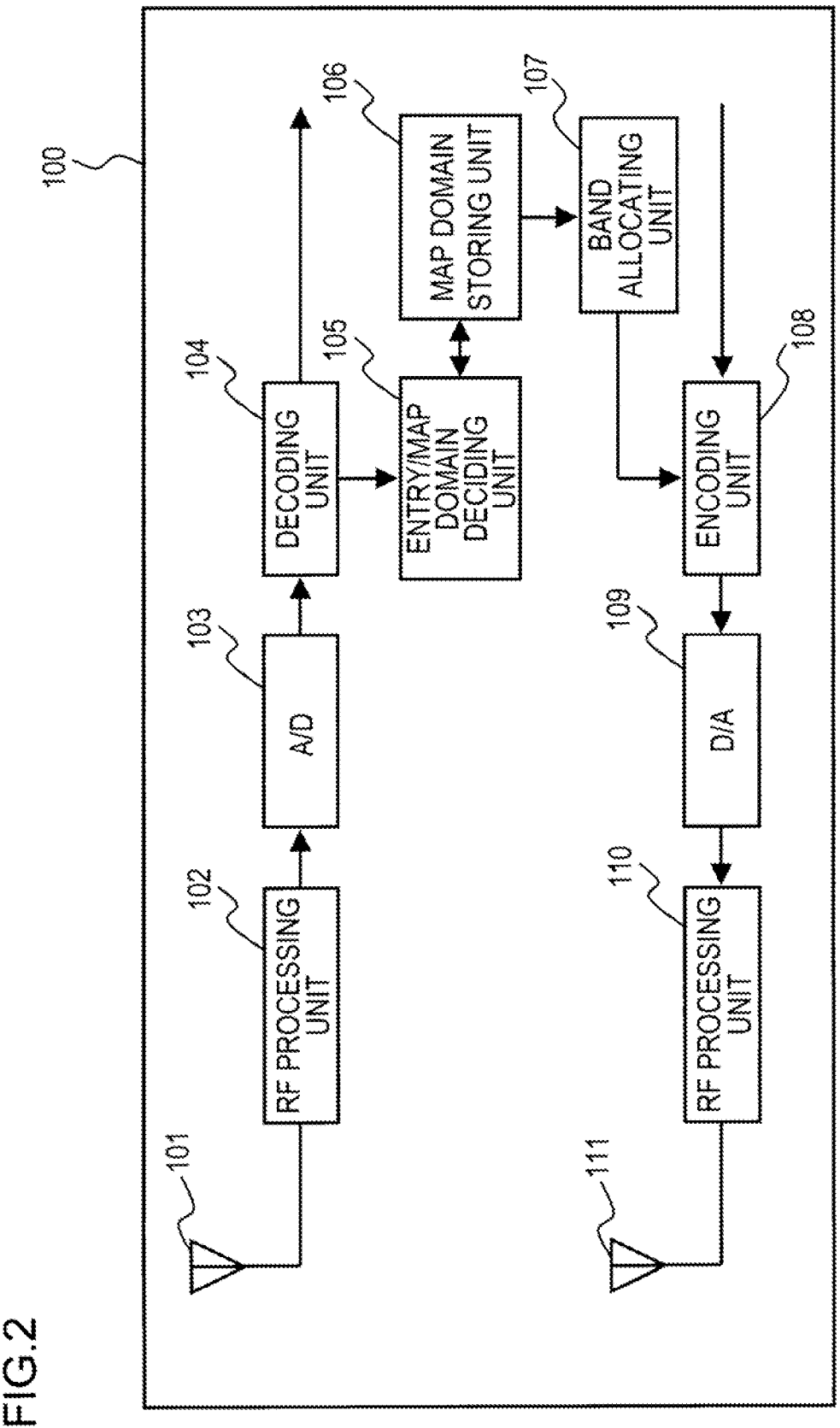
FIG. 2 illustrates a configuration example of a terminal apparatus.
Figure 3:
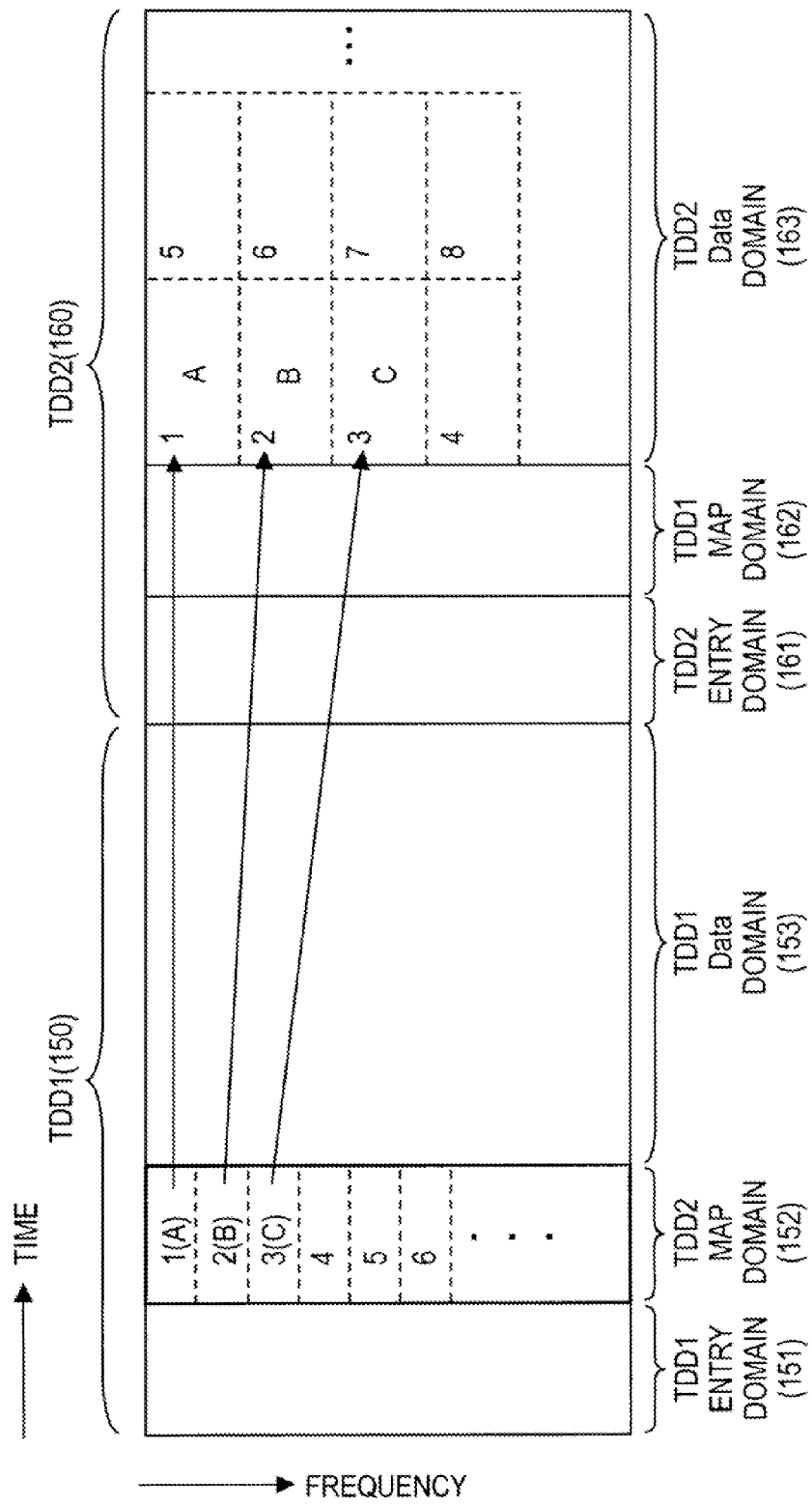
FIG. 3 illustrates a configuration example of a radio frame.

FIG. 1 illustrates a configuration example of a radio communication system 10, FIG. 2 illustrates a configuration example of a terminal apparatus, and FIG. 3 illustrates a radio frame.

The radio communication system 10, as illustrated in FIG. 1, includes a plurality of terminal apparatuses (referred to as "terminals", hereinafter) 100-A to 100-C, and 100-a to 100-i c.

In the embodiment, for facilitating an explanation, the terminal 100-A and the like are grouped into two groups. For example, the terminals 100-A to 100-C are grouped as a first terminal apparatus group, and the terminals 100-a to 100-c are grouped as a second terminal apparatus group. And the radio frame is also grouped into two radio resources (a first and a second radio resource), and each terminal apparatus group uses each radio resource and transmits data and the like. Therefore, each of the terminals 100-A to 100-C and each of the terminals 100-a to 100-c can perform direct radio communication.

In the radio communication via a base station apparatus, the base station apparatus performs a scheduling so that the radio resource is allocated to each terminal apparatus. However, there is no base station performing the scheduling in a terminal-to-terminal communication not via the base station apparatus.

Therefore, in the embodiment as an example illustrated in FIG. 3, it is predetermined that the first terminal apparatus group uses the radio resource of a TDD2 domain 160, the second terminal apparatus group uses the radio resource of a TDD1 domain 150, and the first and second terminal apparatus group transmits data and the like.

Next, a configuration example of the terminal 100 will be explained. The terminal 100 includes a receiving antenna 101, RF processing unit 102, A/D converter 103, decoding unit 104, entry/MAP domain judging unit 105 (referred to as a "domain judging unit 105", hereinafter), MAP domain storing unit 106, band allocating unit 107, encoding unit 108, D/A converter 109, RF processing unit 110, and transmitting antenna 111.

The receiving antenna 101 receives a radio signal transmitted from another terminal 100.

The RF processing unit 102 performs, for example, conversion to a prescribed frequency level and the like by an RF process and the like, to radio signal outputted from the receiving antenna 101.

The A/D converter 103 converts the reception signal outputted from the RF processing unit 102 into digital signal.

The decoding unit (decoder) 104 decodes the reception signal outputted from the A/D converter 103. The decoding unit 104 outputs, for example, reception data received in a data domain to other processing units, and reception signal received in a MAP domain and the like to the domain judging unit 105, of the decoded reception signal.

The domain judging unit 105 performs judgment whether or not data is allocated to the data domain and the like, according to the presence or absence of the signal received in the MAP domain or power in the MAP domain. The detail will be explained below.

The MAP domain storing unit 106 stores a MAP information and the like received by the MAP domain.

The band allocating unit 107 performs an allocation of radio band (or the radio resource, for example, such each resources in time or frequency) to a data and the like on the basis of the MAP information and the like stored in the MAP domain storing unit 106.

The encoding unit (encoder) 108 encodes data and the like outputted from other processing unit.

D/A converter 109 converts data and the like outputted from the encoding unit 108 into analog signal.

The RF processing unit 110 performs RF process and the like to data and the like outputted from the D/A converter 109, and outputs the data and the like as radio signal.

The transmitting antenna 111 transmits to another terminal the radio signal outputted form the RF processing unit 110.

Next, a configuration example of a radio frame illustrated in FIG. 3 will be explained. In the radio frame illustrated in FIG. 3, the horizontal axis indicates a time scale and the vertical axis indicates a frequency scale. As described above, the radio frame is divided into domains such as the TDD1 domain 150 and the TDD2 domain 160.

The TDD1 domain 150 includes a TDD1 entry domain 151, TDD2 MAP domain 152, and TDD1 data domain 153.

The TDD1 entry domain 151 is a domain, for example, by which request for allocation of transmission band in the TDD1 data domain 153 is transmitted. For example, if the terminals 100-*a* to 100-*c* newly uses the TDD1 data domain 153, the terminals 100-*a* to 100-*c* transmit use request by using the TDD1 entry domain 151.

The TDD2MAP domain 152 is a domain, for example, by which signal regarding the presence or absence of band allocation in the TDD2 data domain 163 (referred to as "allocation signal" hereinafter) is transmitted. For example, the first portion of the TDD2 MAP domain 152 becomes a domain, by which the allocation signal and the like indicating the presence or absence of use to the first data domain of the TDD2 data domain 163 is transmitted.

In addition, in the example illustrated in FIG. 3, the TDD2 MAP domain 152 is allocated in the TDD1 domain 150. TDD1 domain 150 is, for example, a radio resource for the terminals 100-A to 100-C to receive signal and the like transmitted from the terminals 100-*a* to 100-*c*. The terminals 100-A to 100-C can confirm the presence or absence of allocation of the TDD2 data domain 163, by using the TDD1 domain 150 which is a radio resource for a reception.

The TDD1 data domain 153 is a domain, for example, which is used by the terminals 100-*a* to 100-*c* for transmitting data and the like.

The TDD2 domain 160 includes a TDD2 entry domain 161, TDD1 MAP domain 162, and TDD2 data domain 163.

The TDD2 entry domain 161 is a domain, for example, by which request for allocation of transmission band in the TDD2 data domain 163 is transmitted. For example, if the terminals 100-A to 100-C newly use the TDD2 data domain 163, the terminals 100-A to 100-C transmits use request by using the TDD2 entry domain 161.

The TDD1 MAP domain 162 is a domain, for example, by which allocation signal and the like indicating the presence or absence of band allocation in the TDD1 data domain 153 is transmitted. For example, the terminals 100-*a* to 100-*c* can confirm the presence or absence of use in the TDD1 data domain 153 on the basis of the presence or absence of allocation signal and the like within the TDD1MAP domain 162.

The TDD2 data domain 163 is a domain, for example, which is used by the terminals 100-A to 100-C for transmitting data and the like.

Figure 4:
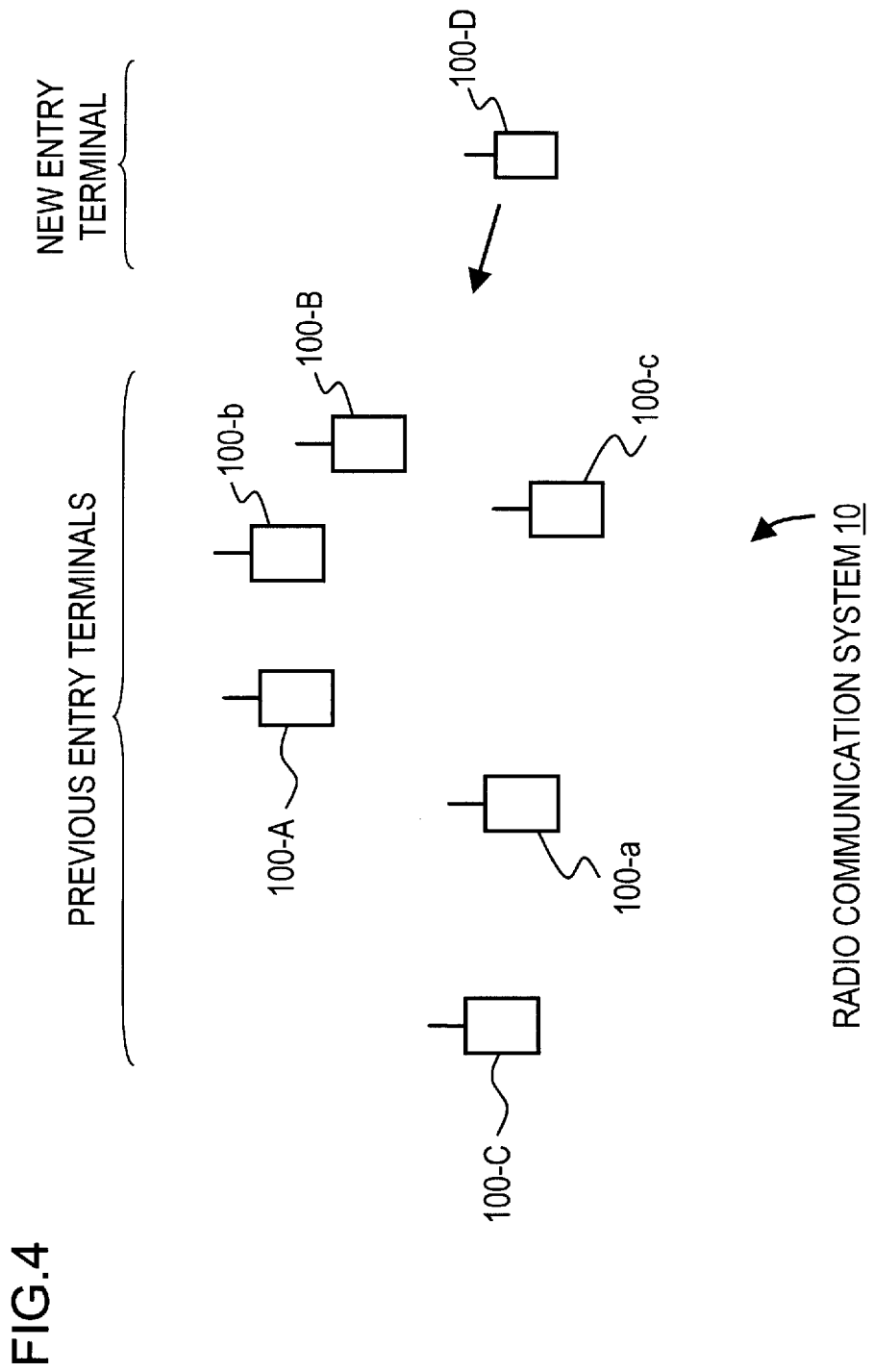
FIG. 4 illustrates a configuration example of a radio communication system.
Figure 7:
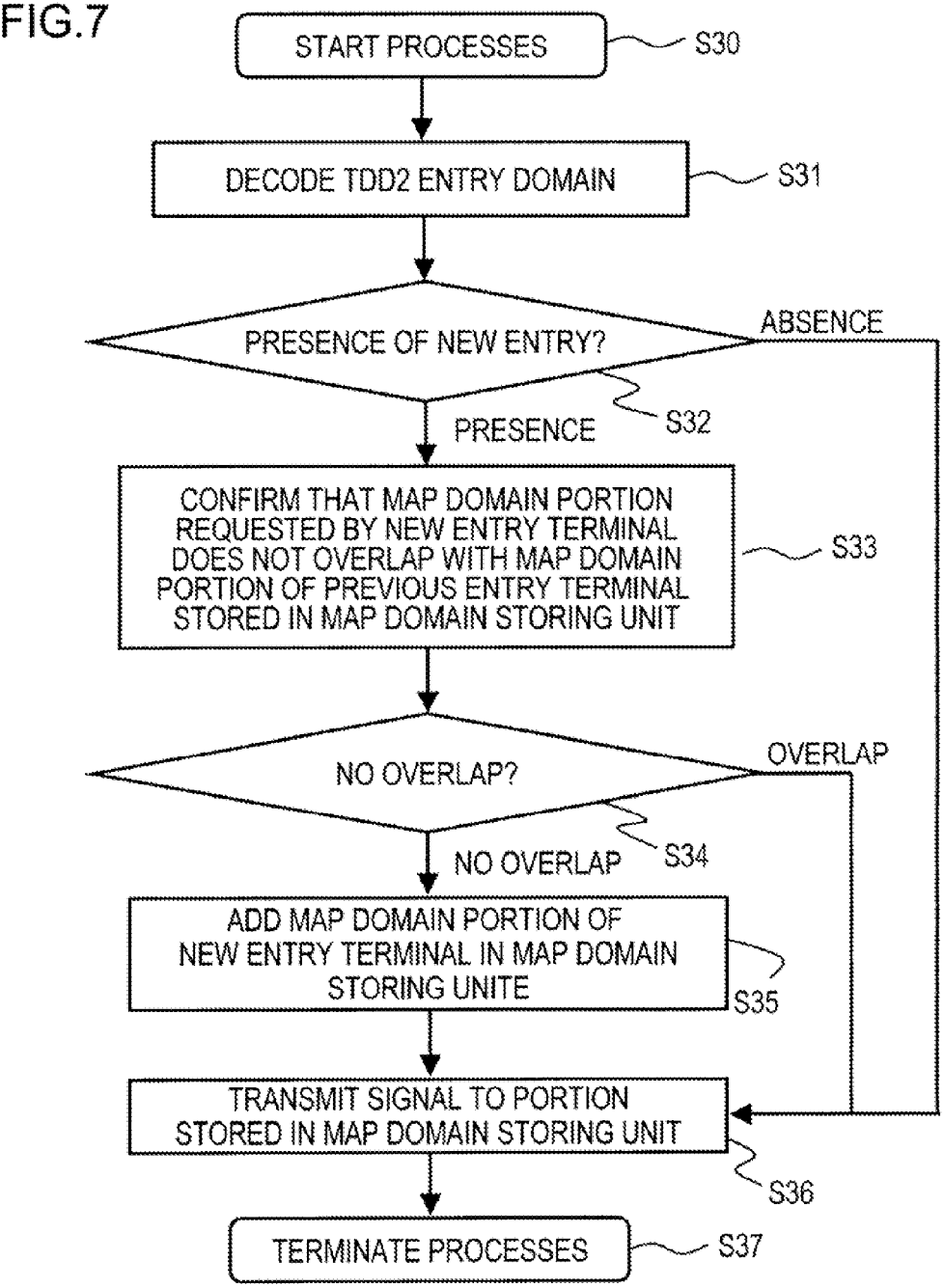
FIG. 7 is a flowchart illustrating an example of operations.

Next, operations will be explained. Below, operation of the terminal 100-D which newly enters into the radio communication system 10 will be explained. FIG. 4 illustrates a configuration example of the radio communication system 10 in such a case, and FIG. 5 and FIG. 7 are flowcharts illustrating an example of the operations.

Here, each of the terminals 100-*a* to 100-*c* preliminarily transmits to each of the terminals 100-A to 100-C allocation signal and the like with regard to the presence or absence of use in the TDD2 data domain 163, by using, for example, as illustrated in FIG. 3, the TDD2 MAP domain 152. Also, each of the terminals 100-A to 100-C transmits data by using, for example, as illustrated in FIG. 3, each domain of the TDD data domain 163. Further, the new entry terminal 100-D belongs to the first terminal apparatus group (the terminals 100-A to 100-C), and the terminal 100-D transmits data and the like by using the radio resource of the TDD2 domain 160 and receives signal and the like by using TDD1 domain 150 similarly to the terminals 100-A to 100-C.

Figure 5:
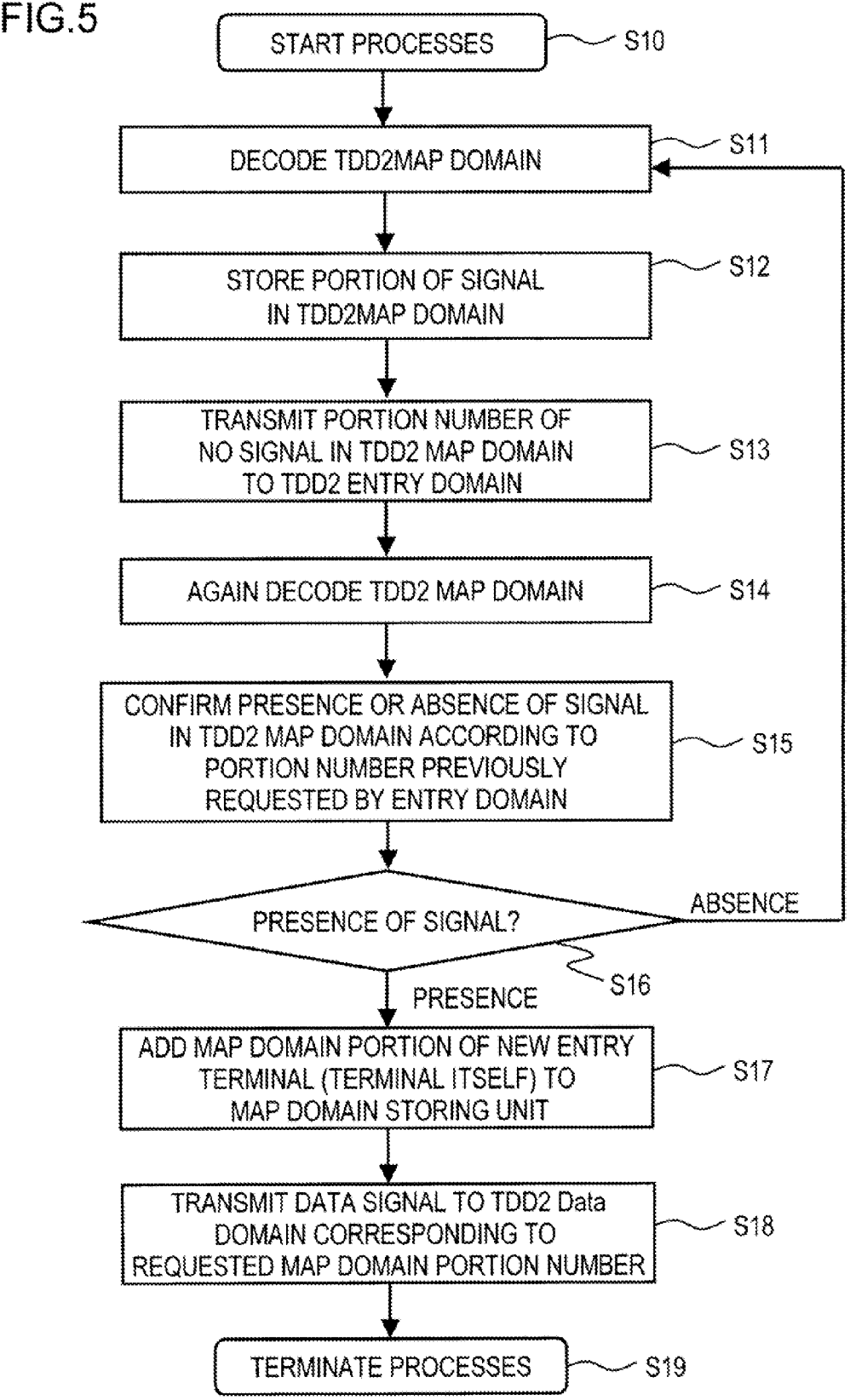
FIG. 5 is a flowchart illustrating an example of operations.

FIG. 5 illustrates an operation example of the new entry terminal 100-D. The new entry terminal 100-D starts a process (S10), and decodes the allocation signal and the like received by using the TDD2 MAP domain 152, of the signal and the like received from previous entry terminals 100-*a* to 100-*c* (S11). For example, the decoding unit 104 decodes.

Next, the terminal 100-D stores in the MAP domain storing unit 106 identification number indicating portion (for example, portion number) where the allocation signal and the like is allocated in the TDD2 MAP domain 152 (S12). In the example of FIG. 3, the domain judging unit 105 stores portion numbers "1" to "3" in the MAP domain storing unit 106.

Figure 6:
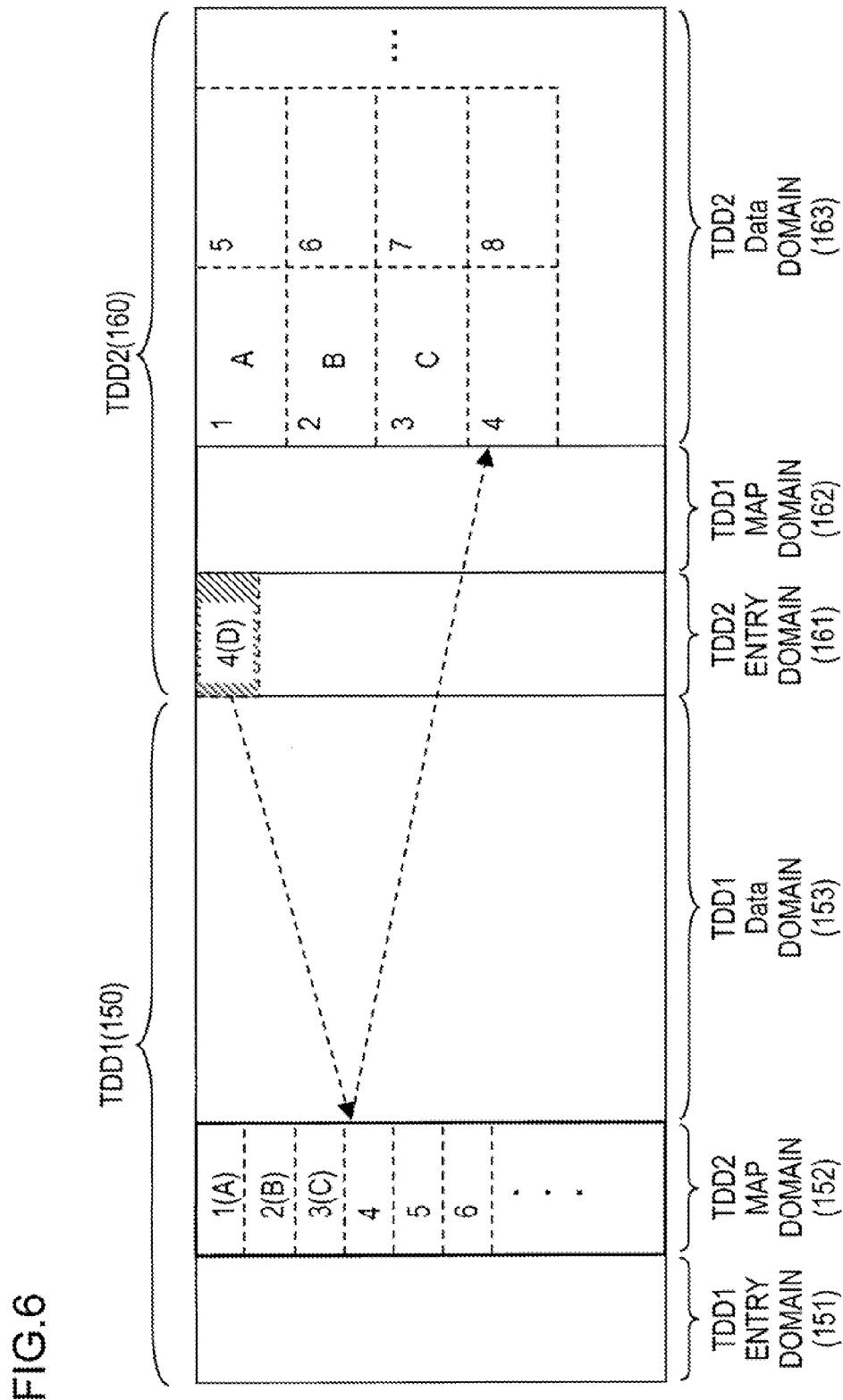
FIG. 6 illustrates a configuration example of a radio frame.

Next, the terminal 100-D transmits signal indicating the portion number to which the allocation signal and the like is not allocated in the TDD2 MAP domain 152 as allocation request of transmission band, by using the TDD2 entry domain 161 (S13). For example, the band allocating unit 107 reads out portion stored in the MAP domain storing unit 106 (for example, "1" to "3"), and transmits signal indicating the portion number not included in the read out portion numbers (for example, "4"). FIG. 6 is illustrating a configuration example of the radio frame in such a case. For example, the terminal 100-D transmits to the previous entry terminals 100-a to 100-c use request indicating requirement for transmitting data by using the fourth domain of the TDD2 data domain 163. In addition, the allocation request may include identification number of the terminal 100-D.

The previous entry terminals 100-a to 100-c perform subsequent processes, after receiving the allocation request. FIG. 7 is a flowchart illustrating an operation example of the terminal 100-a.

The terminal 100-a starts the process (S30), receives signal transmitted from the terminal 100-D, and decodes the transmitted signal by using the TDD2 entry domain 161 (S31). For example, the decoding unit 104 decodes.

Next, the terminal 100-a judges the presence or absence of new entry on the basis of the decoded signal (S32). For example, the domain judging unit 105 judges the presence or absence of the new entry on the basis of whether or not the portion number exists within the TDD2 entry domain 161.

If the terminal 100-a judges the presence of the new entry ("presence" at S32), the terminal 100-a confirms that the MAP domain portion which the new entry terminal 100-D requests does not overlap with the MAP domain portion of the previous entry terminals 100-A to 100-C stored in the MAP domain storing unit 106 (S33). For example, the domain judging unit 105 confirms, by comparing the portion number "4" received by the TDD2 entry domain 161 with the portion numbers "1" to "3" stored in the MAP storing unit 106.

And, if there is no overlap ("absence" at S34), the terminal 100-a adds the MAP domain portion requested by the new entry terminal 100-D to the MAP domain storing unit 106 (S35). For example, the domain judging unit 105 stores the portion number "4" in the MAP storing unit 106. At that time, the identification number of the terminal 100-D may be included.

Next, the terminal 100-a transmits the allocation signal and the like by using the radio domain within the TDD2 MAP domain 152 corresponding to the portion number stored in the MAP domain storing unit 106 (S36). For example, the band allocating unit 107 transmits the allocation signal and the like by using the TDD2 MAP domain 152 corresponding to the portion number stored in the MAP domain storing unit 106 (for example, the TDD2 MAP domain corresponding to the portion numbers "1" to "4"). Further, periods for the TDD1 domain 150 and the TDD2 domain 160 occur in repetition (TDDD1, TDD2, TDD1, ... ). Here, one radio frame consists of the period of the TDD1 domain 150 and the period of the TDD2 domain 160 (see FIG. 6). Therefore, the allocation signal is transmitted by using the TDD2 MAP domain 152, in subsequent radio frame to the radio frame by which the transmission of the TDD2 domain entry 161 is performed.

For example, the band allocating unit 107 and the like, in the process (S36), may simply generate and transmit signal so that the presence or absence of the band allocation in the data domain 163 can be confirmed by the presence or absence of the signal power without the new entry terminal 100-D confirming the content of the allocation signal and the like.

Next, the terminal 100-a terminates a series of the processes (S37).

On the other hand, if the portion requested by the new entry terminal 100-D overlaps with the portion stored in the MAP domain storing unit 106 ("presence" at S34), the terminal 100-a transmits the allocation signal and the like by using the radio domain within the TDDMAP domain 152 corresponding to the portion number stored in the MAP domain storing unit 106 (S36). In this case, for example, the band allocating unit 107 allocates the MAP domain portion of the previous entry terminal 100-A and the like (for example, "1" to "3"), instruct signal generation to the encoding unit 108, and the encoding unit 108 and the like generate and transmit the signal. Therefore, the new entry terminal 100-D can confirm that the portion of the radio band in the requested TDD2 data domain 163 overlaps with those of the previous entry terminals 100-A to 100-C.

Also, if the new entry is not added to the TDD2 entry domain 161 ("absence" at S32), the terminal 100-a transmits the allocation signal and the like by using TDD2 MAP domain 152 corresponding to the portion number stored in the MAP domain storing unit 106 (S36). In this case, for example, since the portion numbers "1" to "3" are stored in the MAP domain storing unit 106, the terminal 100-a transmits the allocation signal and the like by using the domain corresponding to the portion numbers "1" to "3" in the TDD2 MAP domain 152.

Figure 8:
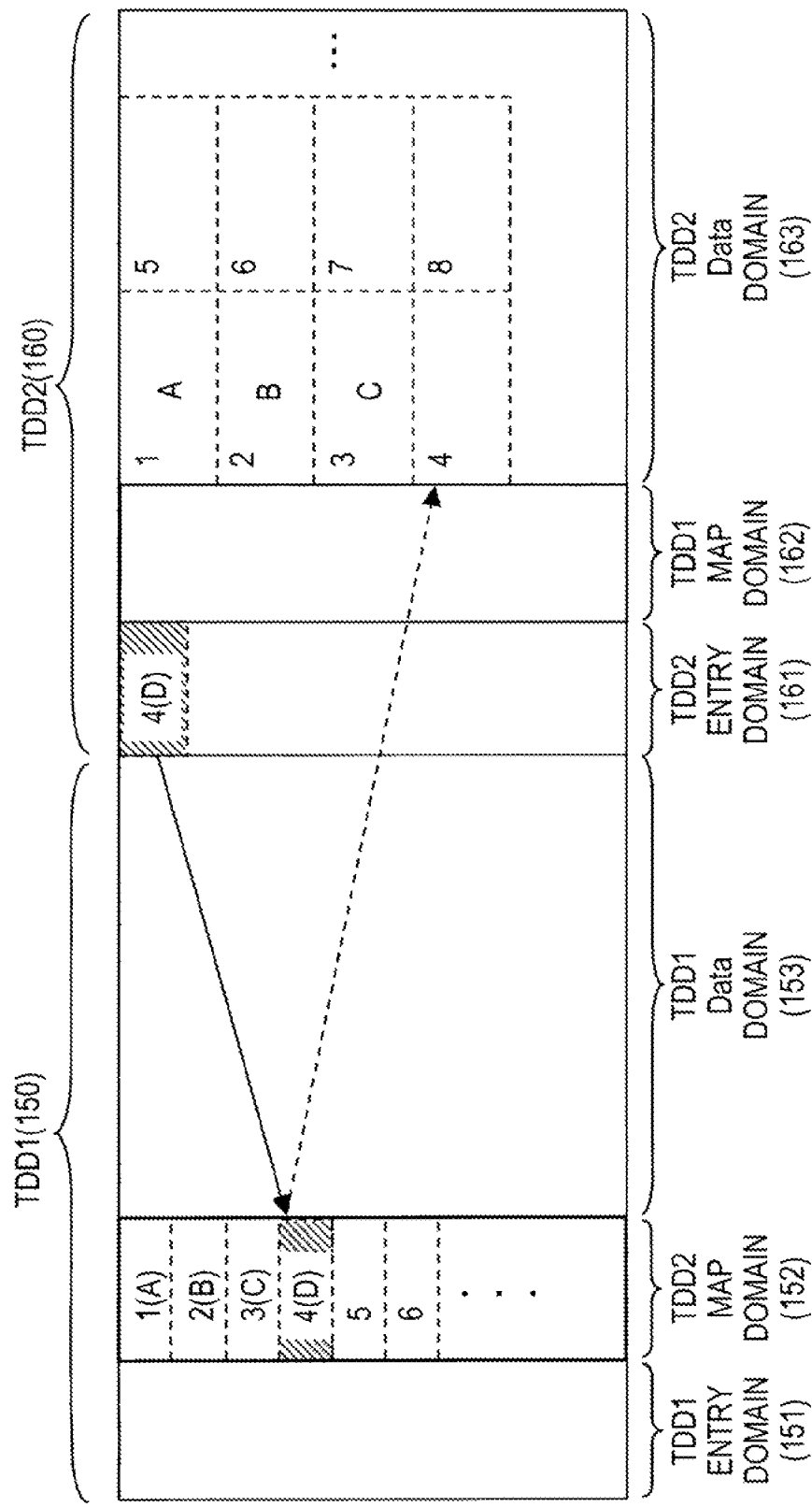
FIG. 8 illustrates a configuration example of a radio frame.

FIG. 8 is illustrating a configuration example of the radio frame in the case, for example, of transmitting the new allocation signal and the like by the portion number "4" of the TDD2 MAP domain 152 at the processes S35 and S36. The terminals 100-a to 100-c transmit the allocation signals and the like to the terminal 100-D and the like by using the portions "1" to "4" of the TDD2 MAP domain 152.

The terminal 100-D (including the terminals 100-A to 100-C) receives the allocation signal and the like transmitted from the terminal 100-a and the like by using the TDD2 MAP domain 152. At this time, the terminal 100-D performs the following process S14 of FIG. 5.

That is, the terminal 100-D decodes the signal transmitted again by using the TDD2 MAP domain 152 (S14 of FIG. 5), and confirms whether or not the allocation signal exists in the TDD2 MAP domain 152 corresponding to the requested portion number (S15). For example, the domain judging unit 105 confirms the presence or absence of the allocation signal or the power in the radio domain of the portion number "4" in the TDD2 MAP domain 152. If the terminal identification number of the terminal 100-D is included, the domain judging unit 105 also confirms the presence or absence thereof so that the domain judging unit 105 confirms that the allocation is for the terminal itself.

Next, if there are the allocation signal and the like in the TDD2 MAP domain 152 corresponding to the requested portion number ("presence" at S16), the terminal 100-D adds the MAP domain portion of the terminal itself in the MAP domain storing unit 106 (S17). For example, the domain judging unit 105 stores in the MAP domain storing unit 106 the portion number "4" of the requested MAP domain portion.

Figure 9:
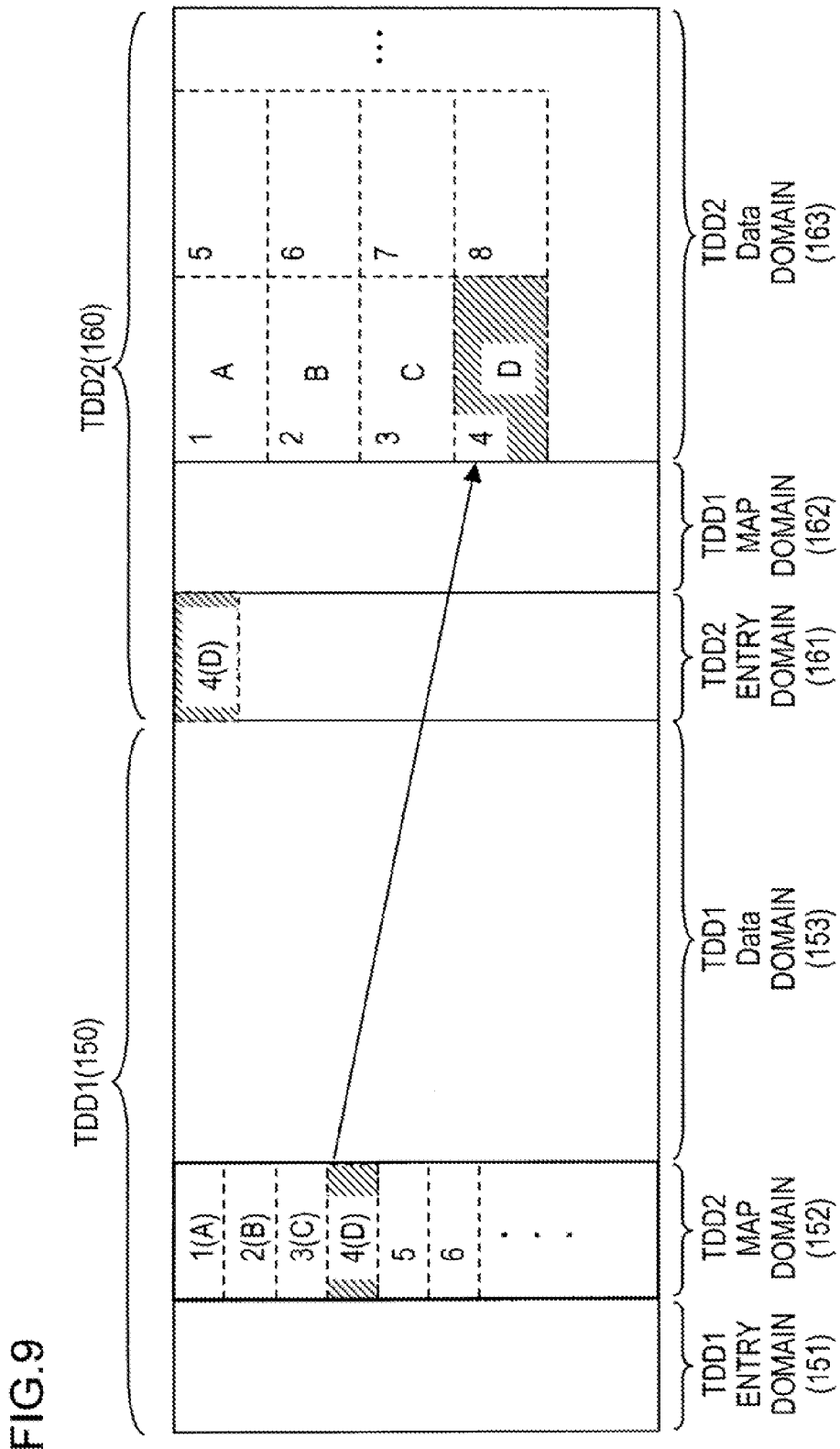
FIG. 9 illustrates a configuration example of a radio frame.

Next, the terminal 100-D transmits the data by using the TDD2 data domain 163 corresponding to the requested MAP domain portion number (S18). FIG. 9 illustrates a configuration example of the radio frame in case of transmitting the data in the TDD2 data domain 163. For example, the band allocating unit 107 allocates the domain of the TDD2 data domain 163 corresponding to the MAP domain portion number "4", and the encoding unit 108 and the like transmit the data by using the domain.

And, the terminal 100-D terminates a series of the processes (S19).

On the other hand, when there is no signal in the TDD2 MAP domain 152 corresponding to the requested portion number ("absence" at S16), the terminal 100-D again performs the process S11 and repeats the above processes.

In this way, since the terminals 100-A to 100-C, for example, do not perform the allocation request for the portion number "4" in the MAP domain portion, the terminals 100-A to 100-C do not perform the data transmission in the data domain corresponding to the portion. Also, in case of collision of transmissions of allocation request and the like, no allocation request is received by the terminals 100-a to 100-c, and there is no allocation (permission) of the data domain in the TDD2 MAP domain 152. Therefore, no data transmission is performed.

Therefore, even in a case that at lease one terminal exists as a hidden terminal, of the another terminal 100-A to 100-C having the possibility which the transmission data may collide with another data, the probability of the collision can be reduced by using the terminals 100-a to 100-c. Therefore, the new entry terminal 100-D can perform the radio communication by the radio band which does not overlap with the previously allocated radio band, and thus the radio communication system 10 can enhance the throughput, compared to the case there is the overlap.

Also, if the previously entry terminal 100-A and the like transmits the allocation signal and the like by the MAP domain 152 and 162, the terminal 100-A transmits the allocation signal and the like so that the new entry terminal 100-D can confirm the presence or absence of the allocation without confirm the signal content.

Therefore, the new entry terminal 100-D and the like can easily confirm the presence or absence of band allocation without decoding the allocation signal and the like.

Figure 10:
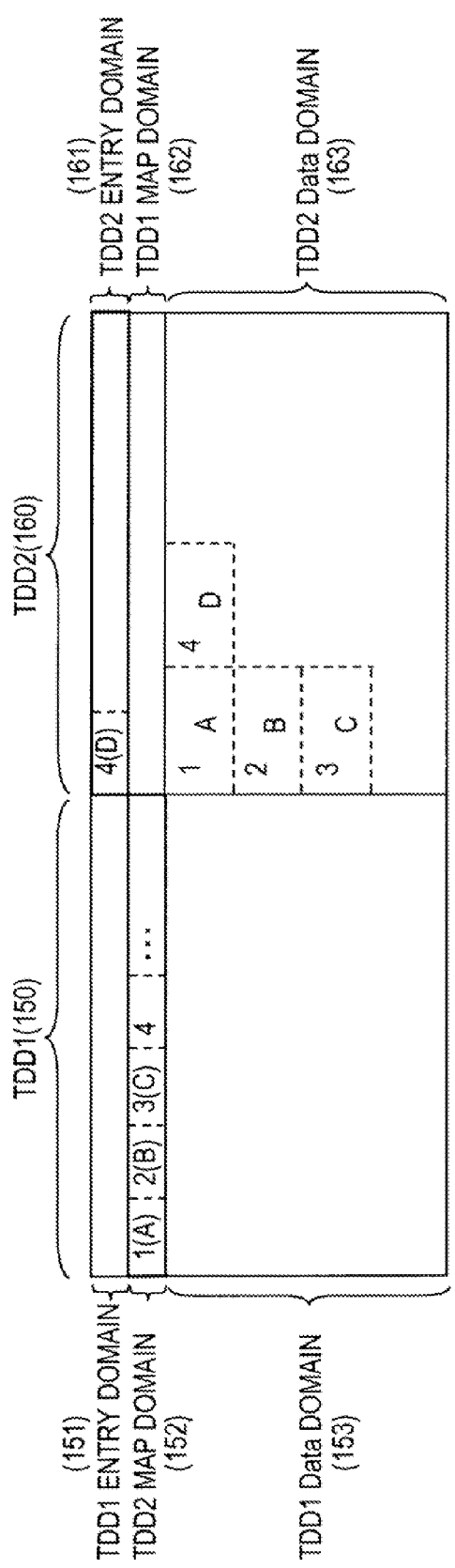
FIG. 10 illustrates a configuration example of a radio frame.

Next, another example will be explained. In the above-described example, it is explained that the entry domains 151 and 162 and the MAP domains 152 and 162 are allocated to different frequency domain in the same time domain in the radio frame (for example, FIG. 9). In another example, the entry domains 151 and 161 and the MAP domains 152 and 162 may be allocated to different time domain in the same frequency domain. FIG. 10 illustrates a configuration example of the radio frame in such the case. In the example of the radio frame illustrated in FIG. 10, the terminals 100-A to 100-D transmit the data and the like by using the TDD2 domain 160, and the terminals 100-a to 100-c transmit the data and the like by using the TDD1 domain 150. The new entry terminal 100-D can confirm the presence or absence of resource allocation in the TDD2 data domain 163 by using the TDD2 MAP domain 152 of the TDD1 domain 150.

Also in the above-described example, it is explained that the radio frame is divided into two parts along the time axis. In another example, it can be implemented even in a case that the radio frame is divided into the frequency axis.

Further, in the above-described example, it is explained that the divided domain number in the radio frame is two. It can be implemented even in case that the divided domain number in the radio frame is three, four parts, or the like. In such cases, the terminals 100 are grouped according to the number of divided domain number.

Further, in the above-described example, it is explained that the terminal 100-a and the like performs radio communication by OFDMA (Orthogonal Frequency Division Multiple Access). In another example, it can be implemented even in case of TDMA (Time Division Multiple Access) or FDMA (Frequency Division Multiple Access). FIG. 11A and FIG. 11B illustrates a configuration example of the radio frame by TDMA, and FIG. 12A to FIG. 12C illustrates a configuration example of the radio frame by FDMA. In either of TDMA or FDMA systems, the previous entry terminals 100-a to 100-c transmit the allocation signal and the like by using the TDD2 MAP domain 152. The newly entry terminal 100-D confirms the unused domain within the TDD2 data domain 163 on the basis of the presence or absence of the allocation signal received by TDD2 MAP domain 162, and transmits the data to the terminals 100-a to 100-c by using the domain.

Further, in the above-described example, it is explained that the new entry terminal 100-D belongs to the terminals 100-A to 100-C (the first terminal apparatus group). In another example, the new entry terminal 100-D may belong to the terminals 100-a to 100-c (the second terminal apparatus group). FIG. 13 illustrates a configuration example of the radio frame in such the case. In this case, the new entry terminal 100-D transmits the use request to the terminals 100-A to 100-C by using the TDD1 entry domain 151 (for example, FIG. 5). The terminals 100-A to 100-C confirm that the TDD1 MAP domain 162 is not already in use (for example, FIG. 7), and transmit by using TDD1 MAP domain 162 the allocation signal and the like indicating the presence or absence of use. The new entry terminal 100-D transmits the data and the like to the terminals 100-A to 100-C. by using the TDD1 data domain 153 indicated by the TDD1 MAP domain 162.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A radio communication system including a first terminal apparatus group for performing a reception by using a first radio resource and a transmission by using a second radio resource; and a second terminal apparatus group for performing the reception by using the second radio resource and the transmission by using the first radio resource, for performing a radio communication between terminals belonging to the first and second terminal apparatus groups, the radio communication system comprising:

a first terminal that belongs to the first terminal apparatus group and transmits allocation request of transmission band in the second radio resource by using the second radio resource;

a second terminal that belongs to the second terminal apparatus group, receives the allocation request transmitted from the first terminal by using the second radio resource, and transmits a first signal by using the first radio resource, the first signal being generated in the case of the first radio resource allocating the transmission band for the first terminal;

a third terminal that belongs to the second terminal apparatus group and transmits allocation request of transmission band in the first radio resource by using the first radio resource; and a fourth terminal that belongs to the first terminal apparatus group, receives the allocation request transmitted from the third terminal by using the first radio resource, and transmits a second signal by using the second radio resource, the second signal being generated in case of the second radio resource allocating the transmission band for the third terminal, wherein the first terminal transmits data by using the allocated transmission band in the second radio resource in accordance with receiving the first signal, the third terminal apparatus transmits data by using the allocated transmission band in the first radio resource in accordance with receiving the second signal, and the fourth terminal allocates an unused portion of the transmission band of the transmission band to the third terminal, and transmits the allocated transmission band as the second signal.

2. The radio communication system according to claim 1, wherein the second terminal allocates an unused portion of the transmission band in the second radio resource to the first terminal apparatus, and transmits the allocated transmission band as the first signal.

3. The radio communication system according to claim 1, wherein the first and second radio resources are radio resources which are used in the different time periods.

4. The radio communication system according to claim 1, the first and second terminals are radio connected with each other by OFDMA system, TDMA system, or FMDA system.

5. The radio communication system according to claim 1, the first and second terminals transmit and receive the allocation request, the first signal, and the data by TDD system or FDD system.

6. A radio communication method in a radio communication system including a first terminal apparatus group for performing reception by using a first radio resource and transmission by using a second radio resource; and a second terminal apparatus group for performing reception by using the second radio resource and transmission by using the first radio resource, for performing a radio communication between terminals belonging to the first and second terminal apparatus groups, the radio communication method comprising:

transmitting allocation request of transmission band in the second radio resource by using the second radio resource, by a first terminal belonging to the first terminal apparatus group;

receiving the allocation request transmitted from the first terminal, and transmitting a first signal by using the first radio resource, the first signal being generated in case of the first radio resource allocating the transmission band for the first terminal, by a second terminal belonging to the second terminal apparatus group;

transmitting, by a third terminal that belongs to the second terminal apparatus group, allocation request of transmission band in the first radio resource by using the first radio resource; and receiving, by a fourth terminal that belongs to the first terminal apparatus group, the allocation request transmitted from the third terminal by using the first radio resource, and transmits a second signal by using the second radio resource, the second signal being generated in case of the second radio resource allocating the transmission band for the third terminal;

transmitting data by using the allocated transmission band in the second radio resource in accordance with receiving the first signal, by the first terminal;

transmitting, by the third terminal apparatus, data by using the allocated transmission band in the first radio resource in accordance with receiving the second signal; and transmitting, by using the fourth terminal allocating an unused portion of the transmission band of the transmission band to the third terminal, the allocated transmission band as the second signal.

* * * * *